(12) United States Patent
Takaoka

(10) Patent No.: US 7,975,167 B2
(45) Date of Patent: Jul. 5, 2011

(54) INFORMATION SYSTEM

(75) Inventor: Masanori Takaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/569,241

(22) Filed: Sep. 29, 2009

(65) Prior Publication Data

US 2010/0088553 A1 Apr. 8, 2010

(30) Foreign Application Priority Data

Oct. 3, 2008 (JP) ................................. 2008-258810

(51) Int. Cl.
*G06F 11/00* (2006.01)
(52) U.S. Cl. ......................................... 714/5.11; 714/10
(58) Field of Classification Search .......................... None
See application file for complete search history.

(56) References Cited

U.S. PATENT DOCUMENTS

| | | | |
|---|---|---|---|
| 2004/0083402 A1* | 4/2004 | Atkinson | 714/11 |
| 2004/0153697 A1* | 8/2004 | Chang et al. | 714/4 |
| 2007/0073990 A1 | 3/2007 | Snaman, Jr. et al. | |
| 2007/0083723 A1 | 4/2007 | Dey et al. | |
| 2007/0136484 A1 | 6/2007 | Kuninsky | |
| 2008/0022148 A1* | 1/2008 | Barnea et al. | 714/5 |
| 2009/0307513 A1* | 12/2009 | Kinouchi | 713/324 |
| 2010/0166422 A1* | 7/2010 | Shanbhag et al. | 398/45 |
| 2011/0007467 A1* | 1/2011 | Bottom et al. | 361/679.02 |

FOREIGN PATENT DOCUMENTS

| | | |
|---|---|---|
| JP | 2005-527006 | 9/2005 |
| JP | 2007-122698 | 5/2007 |
| WO | 03/014950 | 2/2003 |

* cited by examiner

*Primary Examiner* — Michael C Maskulinski
(74) *Attorney, Agent, or Firm* — Staas & Halsey LLP

(57) ABSTRACT

An information system includes a housing with a plurality of units mounted thereon, a communication path built in the housing to take charge of information communication between a plurality of the units mounted on the housing, an information unit mounted on the housing to provide and process the information, a plurality of communication units each mounted on the housing to independently relay the information communication between the information unit and a device external to the housing, and a management unit for accessing the whole or a part of the plurality of the units mounted on the housing and acquiring internal information of the units accessed, wherein in the case where all the plurality of the communication units accessed are incommunicable, the internal information acquired from the plurality of the communication units is reported to the device external to the housing without passing through the plurality of the communication units.

4 Claims, 5 Drawing Sheets

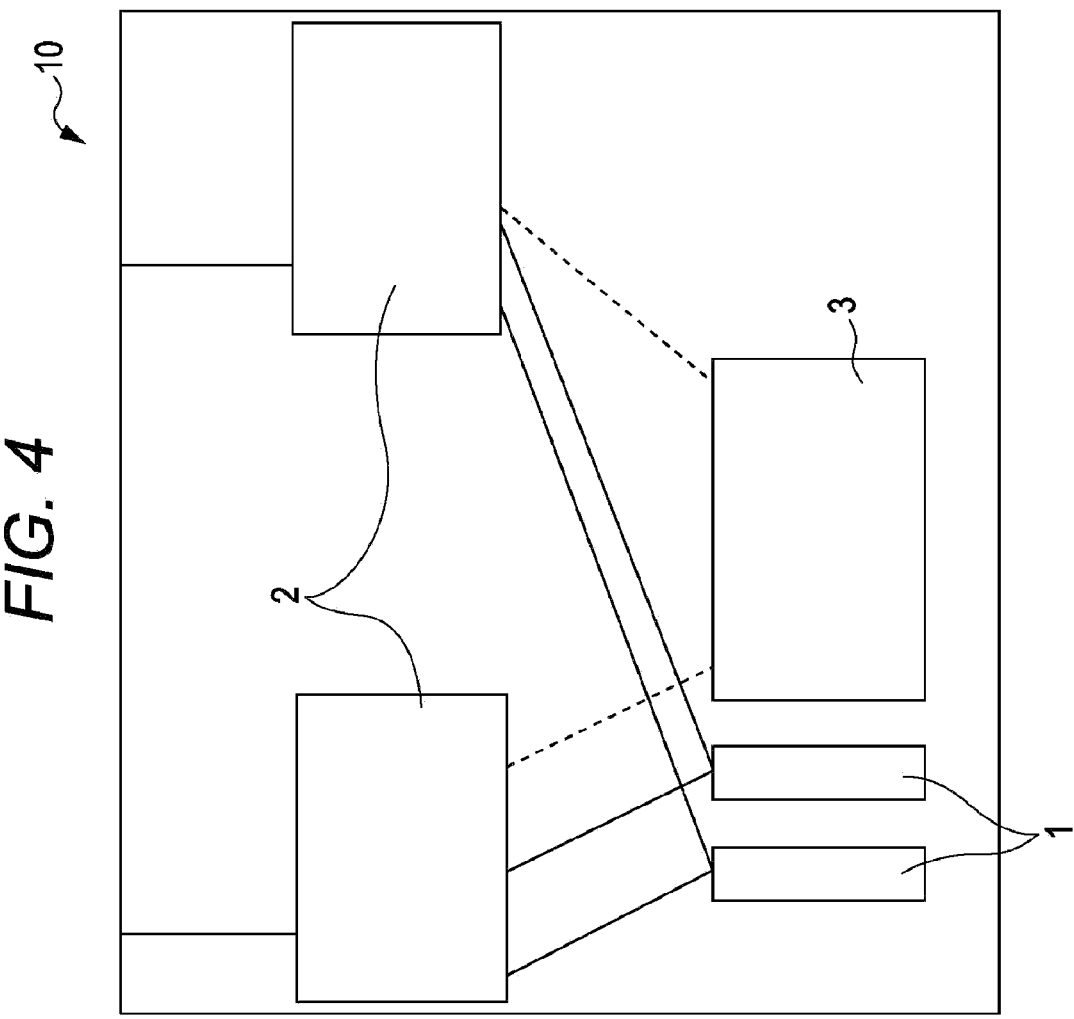

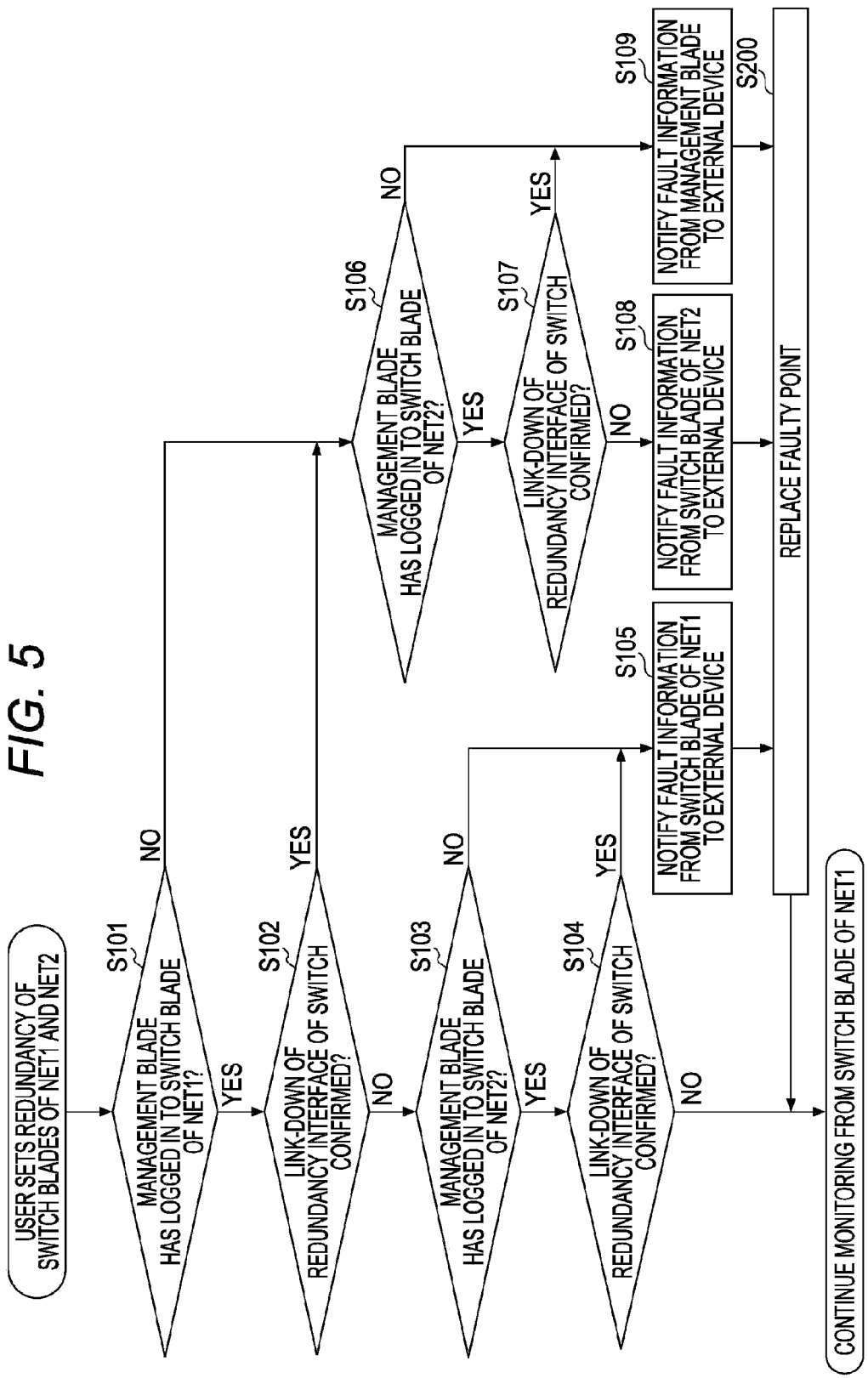

INFORMATION SYSTEM

CROSS-REFERENCE TO RELATED APPLICATIONS

This application is based upon and claims the benefit of priority of the prior Japanese Patent Application No.2008-258810, filed on Oct. 3, 2008, the entire contents of which are incorporated herein by reference.

BACKGROUND

Conventionally, there are known a technique in which a plurality of server units and a management unit are accommodated in a single housing, and the whole housing is operated as one server system. There is also known a technique in which a plurality of information storage units and a management unit are accommodated in a single housing, and the whole housing is operated as one information storage system. In this specification, such a server system and an information storage system are collectively referred to as an information system. In this information system, the management unit conducts the management to operate the information system as one integrated system in outward appearance.

Further, the management unit accesses the server units and the information storage units making up the information system to collect typical internal information such as fault information from these units. The internal information thus collected is used for the management to continue the operation of the information system smoothly in outward appearance, or accessed from outside the information system for maintenance of the information system.

This information system is generally connected to the internet or a LAN to conduct communication with many information terminals and personal computers. Through this communication, the information system carries out the job of providing the information and services to the information terminals, etc. and collecting the information from the information terminals and the personal computers. The housing of the information system also accommodates a communication unit (switch unit). The communication unit is in charge of communication to control the information flow between external devices and each unit in the system.

Once a fault develops in this communication system, the function of the information system is adversely affected. In many information systems, therefore, the redundancy of the communication path is secured by a plurality of communication units (switch units). In this connection, a technique has been proposed wherein in the case where a fault occurs in any of the plurality of the communication units making up the redundant structure, the internal information (especially, the fault information) of the communication unit that has developed the fault is sent to an external device through a communication unit free of the fault.

SUMMARY

According to an aspect of the invention, an information system includes a housing with a plurality of units mounted thereon, a communication path built in the housing to take charge of information communication between a plurality of the units mounted on the housing, an information unit mounted on the housing to provide and process the information, a plurality of communication units each mounted on the housing to independently relay the information communication between the information unit and a device external to the housing, and a management unit for accessing the whole or a part of the plurality of the units mounted on the housing and acquiring internal information of the units accessed, wherein in the case where all the plurality of the communication units accessed are incommunicable, the internal information acquired from the plurality of the communication units is reported to the device external to the housing without passing through the plurality of the communication units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 4 is a diagram showing a comparative example; and

FIG. 5 is a flowchart showing the operation for notifying external devices of fault information in the server system shown in FIGS. 1 to 3.

DETAILED DESCRIPTION OF THE PREFERRED EMBODIMENTS

Figure 1:
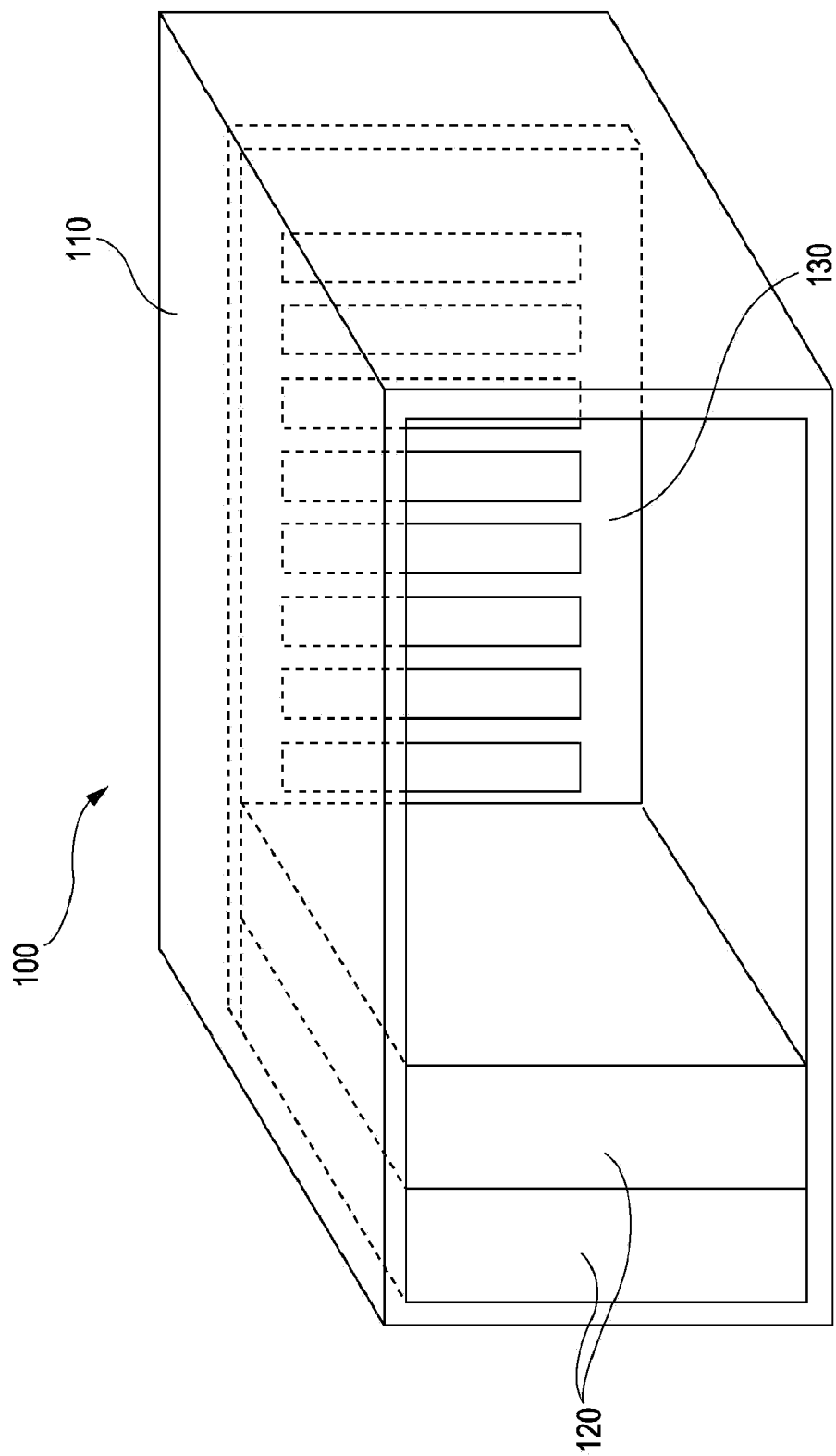
FIG. 1 is a front perspective view showing the front part of a server system of an information system according to a specific embodiment.

Reference may now be made in detail to embodiments of the present invention, examples of which are illustrated in the accompanying drawings, wherein like reference numerals refer to like elements throughout.

An information system in basic form includes a housing with a plurality of units mounted thereon. A communication path is built in the housing to take charge of information communication between the plurality of the units mounted on the housing. An information unit is mounted on the housing to provide and/or process the information. A plurality of communication units is mounted on the housing to relay the information communication independently between the information unit and devices external to the housing. A management unit for accessing the whole or a part of the plurality of the units is mounted on the housing to acquire internal information of the unit accessed. In the case where all of the plurality of the communication units accessed are incapable of communication, the internal information acquired from the plurality of the communication units is reported to a device external to the housing without passing through the plurality of the communication units.

Specific embodiments of the information system of which the basic form has been explained above will be described below with reference to the drawings.

An application form corresponding to the basic form described above is suitably defined as "an information system, wherein each communication unit includes a first communication path for relaying the information communication between the information unit and the device external to the housing and a second communication path for relaying the information communication between the management unit and the device external to the housing, and in the case where all the second communication paths of the plurality of the communication units are incapable of communication, the management unit, without passing through the plurality of the communication units, notifies the external device of the internal information acquired from the plurality of the communication units".

As long as the first communication path is communicable, the job is executed normally and the information system operates normally in appearance. Once the second communication path becomes incommunicable, however, the internal information (especially, the fault information) becomes difficult to acquire. In the case where the entire redundant structure in the second communication path becomes incommunicable, a fault, if developed in the first communication path, cannot be quickly repaired, often resulting in the adverse effect on the job.

According to the preferred application form described above, assume that the entire redundant structure on the second communication path becomes incommunicable. The management unit reports the internal information uniquely to an external device, and therefore, the internal information can be positively secured. As a result, the second communication path can be restored on the one hand, and a countermeasure can be quickly taken against a fault which may develop in the first communication path at the same time.

Also, an application form corresponding to the basic form described above is suitably defined as "the management unit, when the communication unit is inaccessible, uses the internal information acquired by the previous access to the particular communication unit".

In the case where a communication unit is inaccessible, the management unit cannot acquire the internal information and cannot report the current internal information. If no lead can be obtained at all, however, the restoration of the communication unit would become difficult. In this application form, therefore, the previously obtained internal information is reported to the external device in place of the current one. By doing so, the lead for restoration can be obtained, thereby contributing to quick restoration.

A specific embodiment described below corresponds also to a specific embodiment for the suitable applications described above.

Figure 2:
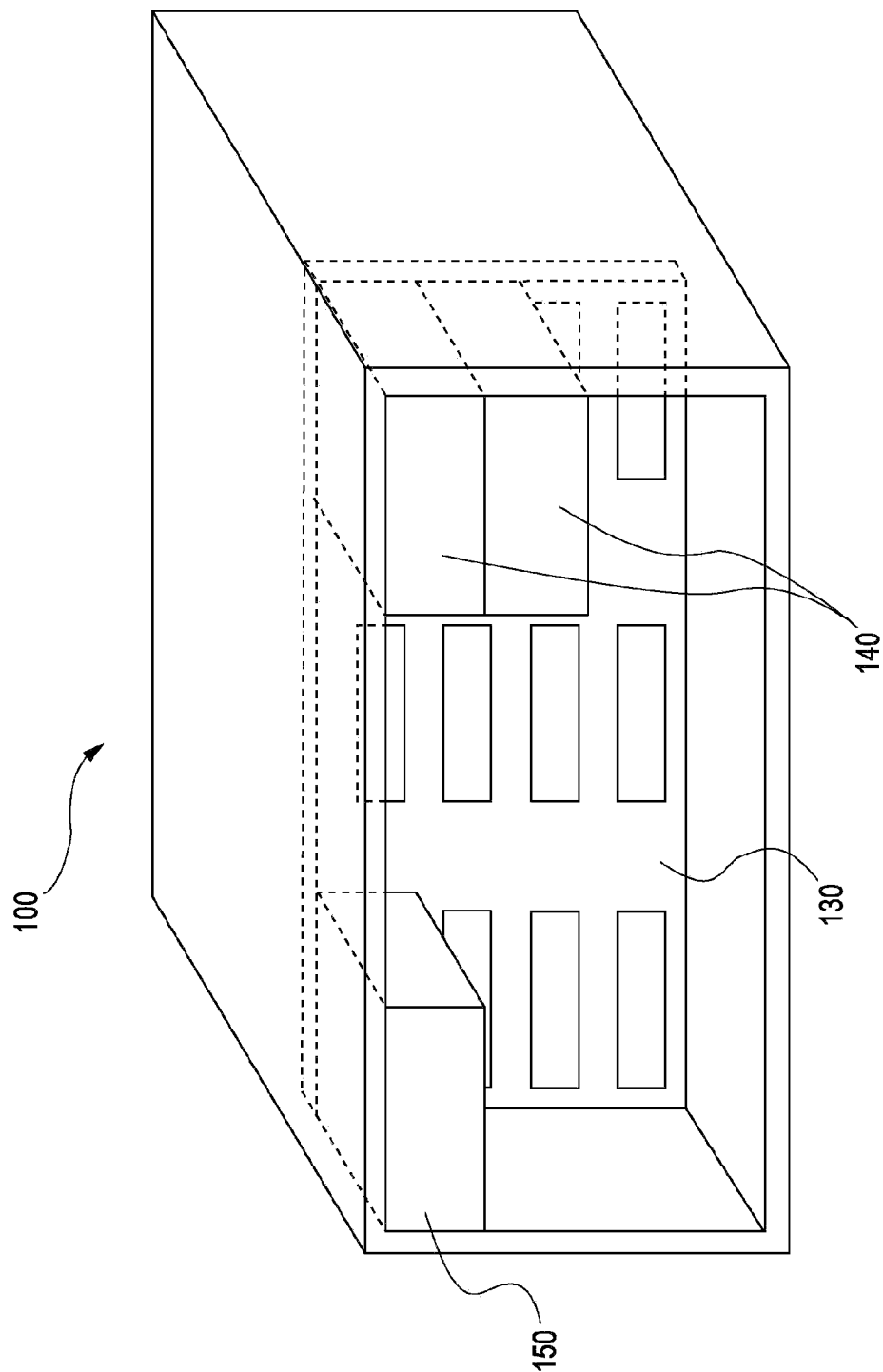
FIG. 2 is a rear perspective view showing the rear part of the server system of the information system according to a specific embodiment.

FIG. 1 is a front perspective view showing the front of the server system of the information system according to a specific embodiment, and FIG. 2 is a rear perspective view showing the rear part of the server system.

This server system 100 is configured of various units called "blades" mounted removably on a housing 110. The housing 110 corresponds to one example thereof in the basic form described above.

A plurality of (two, in this case) server blades 120 are mounted on the housing 110 on the front of the server system 100, while a plurality of (two, in this case) switch blades 140 and a management blade 150 are mounted on the housing 110 in the rear of the server system 100.

Each blade (i.e. the server blade 120, the switch blade 140 and the management blade 150) mounted on the housing 110 has a connector (not shown) on the side thereof inserted into the housing 110. Each blade is connected by this connector to a connector board 130 arranged in the housing 110. The connector board 130 has a bus, through which the blades can conduct the data communication with each other.

Each server blade 120 functions as what is called a server. These server blades 120 can operate in the same manner as if they are one server unit for the server system 100 as a whole under the management of the management blade 150 through the bus of the connector board 130. The server blades 120 correspond to one example of the information system in the basic form described above.

The switch blades 140 are intended to carry out the information communication through the LAN (not shown) connected to the server system 100 and the server blades 120. In the case where the server system 100 is operated as a Web server, for example, the LAN line is connected to the internet. The access to each server blade 120 from an external computer through the internet is assigned to the intended server blade 120 by the switch blades 140. Each switch blade 140 can also relay the access to any server blade 120. That is to say, the communication path between the server blade 120 and the internet makes up a redundant structure.

The switch blades 140 also relay the communication between the management blade 150 and the LAN line. The communication path between the management blade 150 and the LAN line also makes up a redundant structure.

This switch blades 140 correspond to an example of the communication units in the basic form and the application form described above.

The management blade 150 accesses each blade mounted on the housing 110 of the server system 100 and manages it in accordance with the user setting. The management blade 150, in the case shown here, takes charge of the coordination of the server jobs by a plurality of the server blades 120, the construction of the redundant structure of the communication path by the plurality of the switch blades 140 and the acquisition/management of the internal information (the fault information in the case under consideration) of each blade. This management blade 150 corresponds to an example of the management unit in the basic form and the application form described above.

Now, the communication path constructed in this server system 100 will be explained.

Figure 3:
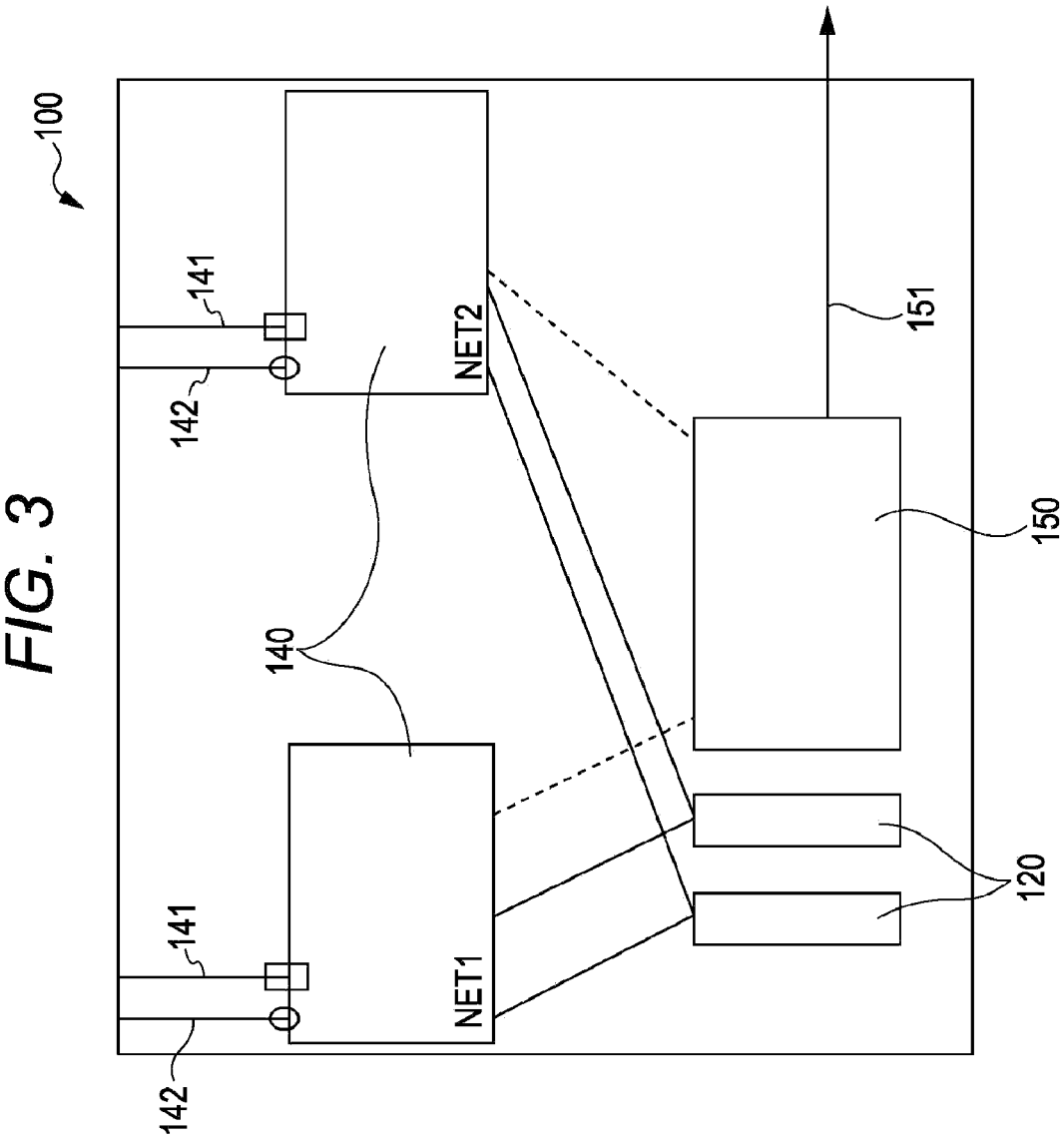
FIG. 3 is a diagram showing the communication path constructed in the server system.

FIG. 3 is a diagram showing the communication path constructed in the server system 100.

A plurality of the server blades 120 built in the server system 100 are connected to a plurality of the switch blades 140, respectively, thereby to construct the redundant structure described above. Also, each switch blade 140 includes a job line 141 for relaying between the server blade 120 and an external device and a management line 142 for relaying between the management blade 150 and an external device. The lines 141, 142 are both constructed as a redundant structure. Incidentally, the switch blades 140, if required to be discriminated from each other in the description that follows, are referred to as "NET1", "NET2" and so on, as shown in FIG. 3.

The management blade 150 is connected to each of a plurality of the switch blades 140 by the communication path for management. The management blade 150 accesses each switch blade 140 and acquires the fault information from each switch blade 140 by way of this communication path. Incidentally, though not shown, the management blade 150 is connected also with a plurality of the server blades 120 through the communication path for management. The management blade 150, upon reception of a fault information request as the result of access thereto from an external device through the management line 142 of the switch blade 140, provides the fault information that has been acquired. Also, the management blade 150 holds a dedicated line 150 connecting to an external device without passing through the switch blades 140, and as described later, notifies the fault information to the external device through the dedicated line 151 whenever required.

Now, a comparative example for comparison with the server system 100 will be explained.

FIG. 4 is a diagram showing the comparative example.

The server system 10 constituting this comparative example includes a plurality of server blades 1, a plurality of switch blades 2 and a management blade 3. The plurality of the server blades 1 are relayed to an external device through a communication path having a redundant structure configured of the plurality of the switch blades 2.

The management blade 3 is connected to each switch blade 2 through the communication path for management, and by accessing each switch blade 2, acquires the fault information. Also, the communication path for relaying between the management blade 3 and the external device has a redundant structure with a plurality of the switch blades 2. The management blade 3, upon reception of a fault information request from an external device accessing it through any of the switch blades 2, provides the fault information that has been acquired.

The management blade 3, however, has no function to report the fault information to the external device by detouring the switch blades 2. If the communication fails due to a fault occurring in any of the plurality of the switch blades 2, therefore, the fault information cannot be reported to the outside of the server system 10. As a result, the restoration becomes difficult in spite of the fact that a fault is existent in the entire redundant structure and is required to be repaired as early as possible.

In contrast with this comparative example, the server system 100 shown in FIGS. 1 to 3 is so designed that the fault information can be acquired from an external source even in the case where the plurality of switch blades all become incommunicable.

FIG. 5 is a flowchart showing the operation of the server system 100 shown in FIGS. 1 to 3 to report the fault information externally. In explaining the operation of this flowchart, the elements shown in FIG. 3 are referred to without specifically designating the reference numerals thereof.

The operation shown in this flowchart is based on the fact that the plurality of the switch blades 140 ("NET1" and "NET2" in this case) make up the redundant structure of the communication path by the user setting. This operation is periodically energized.

First, in operation S101, the management blade 150 logs in to one of the plurality of the server blades 120 ("NET1" in this case). Once the log-in succeeds (YES in operation S101), the management blade 150 confirms in operation S102 whether the communication interface of the management line 142 of "NET1" thus logged in is in link-down state (incommunicable). In the case where the particular communication interface is not in link-down state (NO in operation S102), the "NET1" can continue the communication operation, and therefore, the management blade 150 logs out by acquiring the fault information from "NET1".

Then, in operation S103, the management blade 150 logs in to another one ("NET2" in this case) of the plurality of the server blades 120. In the case where the log-in succeeds (YES in operation S103), the management blade 150 confirms in operation S104 whether the communication interface of the management line 142 of "NET2" thus logged in is in link-down state (incommunicable) or not. In the case where the particular communication interface is not in the link-down state (incommunicable) (NO in operation S104), "NET2" can continue the communication operation. Thus, the management blade 150 logs out by acquiring the fault information from "NET2".

As long as all the plurality of the server blades 120 making up the redundant structure of the communication path in the server system 100 are communicable, the management blade 150 repeats steps S101 to S104 described above and continues to acquire the fault information periodically from each server blade 120.

In the case where "NET1" is communicable while the log-in to "NET2" fails in operation S103 (NO in operation S103) or the link-down state (incommunicable) is confirmed in operation S104 (YES in operation S104), in contrast, the process proceeds to operation S105. In operation 5105, the fault information of "NET2" is reported externally from the management blade 150 through the communicable "NET1". This notification is given as a response to the access of an external monitor server to the server system 100 through the management line 142 of the switch blades 140. Also, in the case where the link-down state (incommunicable) is confirmed in operation S104, the fault information thus reported is the one acquired by the management blade 150 from the switch blade 140 in link-down state. When the log-in ends in failure (NO in operation S103), on the other hand, the fault information reported in the process is the latest one acquired previously when the log-in is possible.

Upon notification of the fault information in operation S105 in this way, the user, etc. replaces the faulty point based on the particular fault information thereby to restore the communication path (operation S200).

In the case where the log-in to "NET1" fails in operation S101 (NO in operation S101) or the link-down (incommunicable) is confirmed in operation S102 (YES in operation S102), then the process proceeds to operation S106 and the management blade 150 logs in to "NET2". Once the log-in succeeds (YES in operation S106), the management blade 150 confirms in operation S107 whether the communication interface of "NET2" thus logged in is in link-down state (incommunicable) or not. In the case where "NET2" is communicable (NO in operation S107), the process proceeds to operation S108 in which the fault information of "NET1" is reported to the external device from the management blade 150 through "NET2".

This notification is made also as a response to the access of an external monitor server to the server system 100 through the server blade 120. The fault information thus reported is also the one acquired from "NET1" in link-down state in the case where "NET1" is accessible. In the case where "NET1" is inaccessible, on the other hand, the fault information thus reported is the latest one previously acquired. The fault information reported in operation S108 is also used by the user to replace the faulty point (operation S200).

In the case where "NET1" cannot be logged in or is incommunicable (NO in operation S101 or YES in operation S102) and "NET2" also cannot be logged in or is incommunicable (NO in operation S106 or YES in operation S107), then the process proceeds to operation S109. In operation S109, the management blade 150 notifies the fault information of "NET1" and "NET2" to an external device (for example, the monitor server described above) from the dedicated line 151. As a result, the fault information that cannot be acquired from an external source in the comparative example described above can be acquired according to this embodiment. Thus, the faulty point is replaced using the particular fault information and the communication path is restored (operation S200).

The explanation of this embodiment is now completed.

Although the foregoing explanation represents the server system 100 as an information system in basic form and a server blade as an information device according to a specific embodiment, this information system in basic form is applicable also to a data base system including an information storage unit as an information device.

Also, the foregoing explanation illustrates two server blades as the "information devices" in the information system in basic form. Nevertheless, either one or three or more information devices may be employed as an application in basic form.

Further, two switch blades are described above as an example of "a plurality of communication units" of an information system in basic form. Nevertheless, three or more communication units can be employed as "a plurality of communication units" with equal effect.

Furthermore, the foregoing description refers to a switch blade holding a plurality of types of lines including the job line and the management line as an example of "the communication unit" in basic form. Nevertheless, only one type of line can be held by "the communication unit".

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information system comprising:
a housing with a plurality of units mounted thereon;
a communication path built in the housing to take charge of information communication between the plurality of units mounted on the housing;
an information unit mounted on the housing to provide and process the information;
a plurality of communication units each mounted on the housing to independently relay the information communication between the information unit and a device external to the housing; and
a management unit for accessing the whole or a part of the plurality of the units mounted on the housing and acquiring internal information of the units accessed, wherein in the case where all the plurality of the communication units accessed are incommunicable, the internal information acquired from the plurality of the communication units is reported to the device external to the housing without passing through the plurality of the communication units.

2. The information system according to claim 1,
wherein the communication units each include a first communication path for relaying the information communication between the information unit and the device external to the housing and a second communication path for relaying the information communication between the management unit and the device external to the housing, and
in the case where all the second communication paths of the plurality of the communication units are incommunicable, the management unit notifies the internal information acquired from the plurality of the communication units to the device external to the housing without passing through the plurality of the communication units.

3. The information system according to claim 1,
wherein in the case where the management unit is incapable of accessing the communication units, the internal information acquired in the previous access to the communication units is used.

4. A method of reporting fault information, comprising:
providing a housing;
mounting a plurality of units on the housing;
building a communication path in the housing to take charge of information communication between the plurality of the units mounted on the housing;
mounting an information unit on the housing to provide and process the information;
mounting a plurality of communication units on the housing to independently relay the information communication between the information unit and a device external to the housing;
accessing at least one of the plurality of the units mounted on the housing;
acquiring internal information of the units accessed; and
reporting the internal information acquired from the plurality of the communication units to the device external to the housing without passing through the plurality of the communication units if all the plurality of the communication units accessed are incommunicable.

* * * * *